United States Patent

[11] 3,607,909

| [72] | Inventors | Laszlo Beregi<br>Boulogene;<br>Pierre Hugon, Rueil-Malmaison; Jean-Claude Le Douarec, Suresnes, all of France |
| --- | --- | --- |
| [21] | Appl. No. | 627,323 |
| [22] | Filed | Mar. 31, 1967 |
| [45] | Patented | Sept. 21, 1971 |
| [73] | Assignee | Science Union et Cie Societe Francaise de Recherche Medicale<br>Suresnes, France |
| [32] | Priority | Apr. 15, 1966 |
| [33] | | Great Britain |
| [31] | | 16,660/66 |

[54] NEW PHENYL-AMINO PROPANE DERIVATIVES
6 Claims, No Drawings

[52] U.S. Cl.................................................. 260/477 R,
260/340.5 R, 260/468 R, 260/471 R, 260/473 R,
260/476 R, 260/478 R, 260/486 R, 260/487 R,
424/309 R, 424/314 R

[51] Int. Cl........................................................ C07c 63/12
[50] Field of Search.......................................... 260/468,
476, 487, 477, 471, 473, 340.5

[56] References Cited
FOREIGN PATENTS

| 863,223 | 3/1961 | Great Britain................ | 260/477 |
| --- | --- | --- | --- |
| 2,962M | 11/1964 | France.......................... | 260/477 |

*Primary Examiner*—Lewis Gotts
*Assistant Examiner*—Paul J. Killos
*Attorneys*—Gordon W. Hueschen and Hueschen & Kurlandsky

ABSTRACT: Trifluoromethylphenyl amino propane substituted on the nitrogen atom (1) optionally, by lower-alkyl of up to 5 carbon atoms, and (2) in any case, by $-(CH_2)_n-OR'$ wherein $n$ is 2 or 3 and $R'$ represents hydrogen or $-COR''$ wherein $R''$ is lower-alkyl, lower-cycloalkyl, lower-alkenyl, or carbocyclic aryl.

These compounds possess anorexigenic, analgesic, anticonvulsant, and lipid metabolism regulating activity.

NEW PHENYL-AMINO PROPANE DERIVATIVES

The present invention provides new trifluoromethylated compounds of phenyl amino propane of the general formula I:

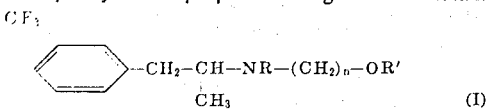

(I)

wherein
R represents a hydrogen atom or a lower-alkyl radical containing up to 5 carbon atoms,
$n$ is the integer 2 or 3 and
R' represents: a hydrogen atom, or the group –COR'',
wherein
R'' represents: 1. a lower-alkyl radical containing from 1 to 6 carbon atoms,
2. a cycloalkyl radical containing from 3 to 7 carbon atoms,
3. a lower-alkenyl radical containing from 2 to 6 carbon atoms,
4. a mono- or bi-cyclic carbocyclic aryl radical.

The lower-alkyl radical (1) may contain one or more substituents selected from (A) halogen atoms such, for example, as chlorine or bromine, (b) carboxyl radical, (C) phenyl radicals which may be substituted by one or more substituents selected from halogen atoms and, lower-alkyl groups (containing up to 4 carbon atoms), (d) phenyloxy radicals, which may be substituted by one or more halogen atoms.

As the cycloalkyl radical (2) there may be mentioned for example, cyclopropyl and cyclopentyl which may be substituted by a phenyl radical.

As the lower-alkenyl radical (3) there may be mentioned, for example, ethenyl, 2-propenyl, 2-methylpropenyl which may be substituted by a phenyl radical which may be itself substituted by a trifluoromethyl group.

As the carbocyclic aryl radical (4) there may be mentioned, for example, phenyl, 1-naphthyl and 2-naphthyl radicals, which may be substituted by one or more substituents selected from halogen atoms and hydroxyl, lower-alkyl (containing up to 4 carbon atoms), methylenedioxy, nitro, amino, trifluoromethyl and phenyl groups.

The compounds of the general formula I are new compounds and can be prepared by reacting a substituted phenyl isopropylamine of the formula II:

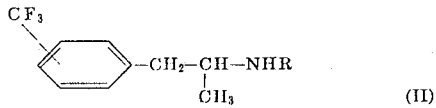

(II)

wherein
R has the meaning given above,
with a hydroxy halogen compound containing 2 or 3 carbon atoms, such for example, as ethylene bromohydrin or with an alkylene oxide such, for example, as ethylene oxide or trimethylene oxide with a view to obtaining compounds where R'=H.

The alcohols thus obtained are esterified with an appropriate acyl halide, anhydride, or acid in the presence of dicyclohexylcarbodiimide, in order to obtain derivatives where R'=COR'', wherein R'' has the meanings given above. To obtain the derivatives for which R'' is a group substituted by an amino radical, the corresponding nitro-compound is reduced with hydrogen and a suitable catalyst.

The esterification may be carried out on racemic, or dextro- or laevo-rotatory amino-alcohols. The resolution can be performed either on the substituted phenyl isopropylamine in order to use the optical isomers as starting materials, or on the hydroxyalkyl compounds themselves, by methods known per se as for example by d(-)dibenzoyltartaric acid to obtain laevo-rotatory, and then with d-camphoric acid to obtain dextro-rotatory derivatives.

The invention also includes within its scope the separate optical isomers.

The new compounds of the general formula I form acid addition salts with the common inorganic and organic acids, and such salts are included in the present invention. As acids suitable for the formation of acid addition salts, there may be mentioned mineral acids such, for example, as hydrochloric, hydrobromic, methanesulfonic, sulfuric, phosphoric and sulfamic acid; suitable organic acids are acetic, propionic, maleic, fumaric, tartaric, citric, oxalic, benzoic and anthranilic acid.

The new compounds and physiologically tolerable additions salts thereof possess valuable pharmacological and therapeutic properties. They find application more specifically as anorexigenic agents and as analgesic, anticonvulsant, and lipid metabolism-regulating agents.

The invention also includes pharmaceutical preparations for oral, rectal or parenteral administration, in the treatment of pain, epilepsy, obesity or other disorder, which comprises a compound of the invention or a physiologically tolerable salt thereof in admixture or conjunction with a pharmaceutically suitable carrier.

Their toxicity is low and the $LD_{50}$ is from 92 to 312 mg./kg. in mice administered intraperitoneally, and from 750 to 2000 mg./kg. perorally.

The anorexigenic action was studied in the rat and the dog. It was found that the new compounds, administered orally at a dose of 4.6 to 20 mg./kg., reduce the intake of food of animals by 50% in the 2 hours following the treatment.

The analgesic activity was demonstrated by Haffner's method (D.M.W.55, 731, 1929), in mice. Administered intraperitoneally the active dose is situated between 20 to 50 mg./kg. for the different compounds of the invention.

An anticonvulsive activity was also noted with the new compounds. It was observed that a dose of 20 to 50 mg./kg., administered orally, protects 50% of the animals from the electroshock effects.

The action on lipid metabolism was observed in determining the free fatty acids (FFA) in plasma, and by the diminution of epididymal fat in the animals treated with the new compounds. It was found that some compounds of the invention, administered orally at a dose of 50 mg./kg., induce in the rat an increase of the nonesterified fatty acids as great as 89%. Administered perorally for 10 days at the dose of 30 to 50 mg./kg. per day, a noticeable reduction of epididymal fat, as great as 45%, was noted in comparison with the untreated animals.

The properties herein-above described and their low toxicity, make these new compounds useful in human therapy, especially in the treatment of obesity, pain and epilepsy.

The compounds of the invention may be administered to patients in various pharmaceutical forms such, for example, as tablets, dragees, granules, capsules, gelules, suppositories, or drinkable or injectable solution, in association with the usual pharmaceutical solid or liquid carriers such, for example, as distilled water, lactose, talc, gum-arabic, magnesium stearate or ethyl cellulose.

The cases may vary from 10 to 200 mg. in oral, rectal or parental administration.

The following examples illustrate the invention, the parts being by weight unless otherwise stated, and melting points being determined by the Kofler method.

EXAMPLE 1

1-(m-triflouromethylphenyl)-2-($\beta$-hydroxy-ethyl)-amino propane

In an autoclave of 1 l., being held at −20° C., there were added 305 parts of 1-(m-trifluoroethylphenyl)-2-amino propane to 53 parts of ethylene oxide and 37.5 parts of water. After being allowed to warm at room temperature, at which point it was stirred for 1 hour, the reaction mixture was heated to 100°–110° C. and maintained at this temperature for 4 hours.

Distillation of the crude product yielded 154 parts of 1-(m-triflouromethylphenyl)-2-($\beta$-hydroxy-ethyl)-amino propane, B.P. 109°–111° C. at 0.4 millimeters pressure. Acid fumarate m.p. 133° C. (isopropanol).

EXAMPLE 2

1    1-(m-triflouromethylphenyl)-2-($\beta$-hydroxy-ethyl)-amino propane 75 parts of dl 1-(m-trifluoromethylphenyl)-2-(β-hydroxyethyl)-amino propane were added to a solution of 147 parts of d (-) -dibenzoyl tartaric acid in 1800 parts of ethyl acetate held at reflux while stirring. After being allowed to cool at room temperature, the salt was collected by filtration, washed with ethyl acetate and dried, yielding 95 parts of salt A, which after being twice recrystallized from ethanol, afforded 65 parts of the pure salt, m.p. 154° C.

Liberation of the base from salt A with aqueous sodium hydroxide, followed by extraction with ether, and drying over MgSO₄ gave 23.5 parts of l 1-(m-trifluoromethylphenyl)2-(β-hydroxy-ethyl) amino propane. B.P. 109° C. at 0.7 millimeters pressure. The $[\alpha]_D^{22}$ was −13.7° (C.16; ethanol). Acid fumarate m.p. 135° C. (isopropanol).

EXAMPLE 3 d 1-(m-trifluoromethylphenyl)-2-(β-hydroxyethyl)-amino propane

The filtrate remaining after separation of salt A of example 2 was concentrated in vacuo and the base liberated. 24 parts were obtained, boiling at 111°–115° C. at 1.05–1.1 millimeter pressure. The $[\alpha]_D^{22.5}$ was +6.5 (C. 16; ethanol) 25 parts of this base were treated with 22 parts of d-camphoric acid in 80 parts of ethyl acetate. When crystallization was complete, the solid salt B was collected by filtration and dried, yielding 18 parts of d-acid camphorate, m.p. 126° C. Recrystallization from 56 parts of ethyl acetate afforded 16 parts of the pure salt, m.p. 127° C.

Liberation of the base from salt B with aqueous sodium hydroxide gave the dextro-rotatory compound, b.p. 111°–112° C. at 0.95 millimeters pressure. The $[\alpha]_D^{22.5}$ was +13.6° (C.16; ethanol). Acid fumarate m.p. 135° C. (isopropanol).

EXAMPLE 4 1-(m-trifluoromethylphenyl)-2-(γ-hydroxypropyl)-amino propane

In an autoclave being held at -10° C. there were added 100 parts of 1-(m-trifluoromethylphenyl)-2-amino propane 17 parts of trimethylene oxide and 12 parts of water. After being allowed to warm at room temperature, at which point it was stirred for one hour, the reaction mixture was heated to 150° C. and maintained at this temperature for 12 hours. Distillation of the crude product yielded 41 parts, b.p. 115° C. at 0.5 millimeters pressure. The hydrochloride recrystallized from ethyl acetate melted at 95°–96° C.

EXAMPLE 5

1-(m-trifluoromethyphenyl)-2-(β-acetyloxy-ethyl)-amino propane hydrochloride

To a solution of 14.2 parts of 1-(m-trifluoromethylphenyl)-2-(β-hydroxy-ethyl)-amino propane hydrochloride in 70 parts of ethyl acetate are added 5.1 parts of acetic anhydride. After 2 hours of reflux, the solution is cooled and the product is suctioned off, and recrystallized in 70 parts of ethyl acetate, yielding 8.8 parts of 1-(m-trifluoromethylphenyl)-2-(β-acetyl-oxy-ethyl)-amino propane hydrochloride melting at 136° C.

By the same manner the following compounds were prepared:
  a. 1-(m-trifluoromethylphenyl)-2-(β-propionyloxy-ethyl)-amino propane hydrochloride, M.P. 135° C. (isopropanol), starting from 1-(m-trifluoromethylphenyl)-2-(β-hydroxy-ethyl)-amino propane and propionic anhydride.
  b. 1-(m-trifluoromethylphenyl)-2-(β-succinyloxy-ethyl)-amino propane hydrochloride, M.P. 113° C. (ethyl acetate), starting from 1-(m-trifluoromethylphenyl)2-(β-hydroxy-ethyl) amino propane and succinic anhydride.

EXAMPLE 6

1-(m-trifluoromethylphenyl)-2-(β-salicyloyloxy-ethyl)-amino propane hydrochloride To a solution 24.7 parts of 1-(m-trifluoromethylphenyl)-2-(β-hydroxyethyl)-amino propane in 140 parts of anhydrous benzene there were added successively, 15 parts of 4.7N hydrochloric ether and a solution of 15.6 parts of salicyloyl chloride in 24 parts of anhydrous benzene. The addition required 10 min., the reaction mixture was then refluxed for 3 hours. -(m-triflouromethylphenyl)-

The solid product was collected by filtration and after recrystallization from 180 parts of ethyl acetate, there were obtained 30.5 parts of 1-(m-trifluoromethylphenyl)-2-(β-salicyloyloxy-ethyl)-amino propane hydrochloride, melting at 144° C.

EXAMPLE 7

1-(m-trifluoromethylphenyl)-2-(β-benzoyloxy-ethyl)-amino propane hydrochloride

To a solution of 24.7 parts of 1-(m-trifluoromethylphenyl)-2-(β-hydroxy-ethyl)-amino propane in 140 parts of anhydrous benzene, there were added successively 15 parts of 4.7N hydrochloric ether and a solution of 14 parts of benzoyl chloride in 24 parts of anhydrous benzene. The addition required 10 minutes, the reaction mixture was then refluxed for 8 hours.

The solid product was collected by filtration and after recrystallization from 230 parts of ethyl acetate, there were obtained 15 parts of 1-(m-trifluoromethylphenyl)-2-(β-benzoyloxy-ethyl)-amino propane hydrochloride melting at 161° C.

10 parts of this hydrochloride are put in suspension in 100 parts of water; 80 parts of ether are added then 10 parts of a concentrated solution of ammonium hydroxide. The mixture is stirred for few minutes until dissolving of the salt, the ethered solution is poured off and dried. After the ether is eliminated under -(m-trifluoromethylpehnyl)-9 parts of 1-(m-trifluoromethylphenyl)-2-(β-benzoyloxy-ethyl)-amino propane are obtained; the base is a colorless oil.

5.5 parts of this base are dissolved in 38 parts of absolute ethanol, and the so obtained solution is added to 2.2 parts of fumaric acid in 90 parts of absolute ethanol. The mixture is heated until dissolving of the precipitate, then cooled. After filtration and drying, 5 parts of fumarate of 1-(-trifluoromethylphenyl)2-(β-benzoyloxy-ethyl)-amino propane are obtained, melting at 161°–162° C.

By the same manner, the following compounds were prepared:
  a. d 1-(m-trifluoromethylphenyl)-2-(β-benzoyloxy-ethyl)-amino propane hydrochloride, M.P. 156° C. (isopropanol) starting from d 1-(m-trifluoromethylphenyl)-2-(β-hydroxy-ethyl)-amino propane and benzoyl chloride.
  b. l 1-(m-trifluoromethylphenyl)-2-(β-benzoyloxy-ethyl)-amino propane hydrochloride, M.P. 156°–157° C. (isopropanol) starting from L -(m-trifluoromethylphenyl)-2-(β-hydroxy-ethyl)-amino propane and benzoyl chloride.

EXAMPLES 8–35

The following examples have been prepared according to the process described in example 7.

8. 1-(p-trifluoromethylphenyl)-2-(β-benzoyloxy-ethyl)-amino propane hydrochloride, M.P. 170°–171° C. (ethyl acetate), starting from 1-(p-trifluoromethylphenyl)-2-(β-hydroxy-ethyl)-amino propane and benzoyl chloride.
9. 1-(m-trifluoromethylphenyl)-2-(β-chloroacetyloxy-ethyl)-amino propane hydrochloride, M.P. 128°–130° C. (isopropanol/ligroin), starting from 1-(p-trifluoromethylphenyl)-2-(β-hydroxy-ethyl)-amino propane and chloroacetic acid chloride.
10. Trans-1-(m-trifluoromethylphenyl)-2-(β-cinnamoyloxy-ethyl)-amino propane hydrochloride, M.P. 159°–160° C. (ethyl acetate), starting from 1-(m-trifluoromehtylphenyl)-2-(β-hydroxy-ethyl)-amino propane and trans-cinnamoyl chloride.
11. 1-(mtrifluoromethylphenyl)-2[β-(p-chlorophenoxyacetyloxy)-ethyl]-amino propane hydrochloride, M.P.

124°–125° C. (xylene), starting from 1-(-trifluoromethylphenyl)-2-(β-hydroxy-ethyl)-amino propane and p-chlorophenoxy acetic acid chloride.

12. 1-(m-trifluoromethylphenyl)-2-(β-phenylpropionyloxy-ethyl)-amino propane hydrochloride, M.P. 93°–94° C. (benzene-cyclohexane), starting from 1-(m-trifluoromethylphenyl)-2-(β-hydroxy-ethyl)-amino propane and phenyl propionic acid chloride.

13. 1-(m-trifluoromethylphenyl)-2-[β-(β',β'-dimethylacryloyloxy)-ethyl]-amino propane hydrochloride, M.P. 153°–154° C. (isopropanol), starting from 1-(-(m-trifluoromethylphenyl)-2-(β-hydroxy-ethyl)-amino propane and β,β-dimethyacrylic acid chloride.

14. 1-(m-trifluoromethylphenyl)-2-[-(β-cyclopropylcarboxyloxy-ethyl)-amino propane hydrochloride, M.P. 136°–138° (isopropanol), -(m-triflouromethylphenyl)-from 1-(m-trifluoromethylphenyl)--trifluoromethylphenyl)--(β-hydroxy-ethyl)-amino propane and cyclopropylcarboxylic acid chloride. salicyloyl 15. 1-(m-trifluoromethylphenyl)-2-[N-(β-salicyloyloxy-ethyl)-N-ethyl]-amino propane hydrochloride, M.P. 136°–138° C. (acetone/ligroin), starting from 1-(m-trifluoromethylphenyl)-2-[N-(β-hydroxy-ethyl)-N-ethyl]-amino propane and salicyloyl chloride.

16. 1-(m-trifluoromethylphenyl)-2[β-(m-trifluoromethyl α-methyl cinnamoyloxy)-ethyl]-amino propane hydrochloride, M.P. 105°–108° C. (xylene/cyclohexane), starting from 1-(m-trifluoromethylphenyl)-2(β-hydroxy-ethyl)-amino propane and M-trifluoromethyl α-methyl m-trifluoromethyl acid chloride.

17. 1-(m-trifluoromethylphenyl)-m-trifluoromethyl)-2-(β-phenylcyclopentanecarboxyloxy-ethyl)-amino propane hydrochloride, M.P. 142° C. (ethyl acetate), starting from 1-(m-trifluoromethylphenyl)-2-(β-hydroxy-ethyl)-amino propane and phenylcyclopentane carboxylic acid chloride.

18. 1-(m-trifluoromethylphenyl)-2-[β-(p-chlorobenzoyloxy)-ethyl]-amino propane hydrochloride, M.P. 147° C. (ethyl acetate), starting from 1-(m-trifluoromethyphenyl) 2-(β-hydroxy-ethyl)-amino propane and o-chlorobenzoyl chloride.

19. 1-(m-trifluoromethylphenyl)-2[β-(m-trifluoromethyl-benzoyloxy)-ethyl]-amino propane hydrochloride, M.P. 137° C. (ethyl acetate), starting from 1-(m-trifluoromethylphenyl)-2-(β-hydroxy-ethyl)-amino propane and m-trifluoromethyl benzoyl chloride.

20. 1-(m-trifluoromethylphenyl)-2-(β-phenylacetyloxy-ethyl)-amino propane hydrochloride, M.P. 102°–104° C. (xylene), starting from 1-(m-trifluoromethylphenyl)-2-(β–HYDROXY–ETHYL)-amino propane and phenylacetic chloride.

21. 1-(m-trifluoromethylphenyl)-2-[β-(p-chlorobenzoyloxy)-ethyl]-amino propane hydrochloride, M.P. 169° C. (acetone), starting from 1-(m-trifluoromethylphenyl)-2-(β-hydroxy-ethyl)-amino propane and p-chlorobenzoyl chloride.

22. 1-(m-trifluoromethylphenyl)-2-[β-(p-chlorobenzoyloxy)-ethyl]-amino propane hydrochloride, M.P. 160°–162° C. (xylene), starting from 1-(m-trifluoromethylphenyl)-2-(β-hydroxy-ethyl)-amino propane and p-fluorobenzoyl chloride.

23. 1-(m-trifluoromethylphenyl)-2-[β-(p-phenylbenzoyloxy)-ethyl]-amino propane hydrochloride, M.P. 180° C. (ethanol/acetone), starting from 1-(m-trifluoromethylphenyl)-2-(β-hydroxy-ethyl)-amino propane and p-phenylbenzoyl chloride.

24. 1-(m-trifluoromethylphenyl)-2-[β-(p-methylbenzoyloxy)-ethyl]-amino propane hydrochloride, M.P. 186°–187° C. (ethanol), starting from 1-(m-trifluoromethylphenyl)-2-(β-hydroxy-ethyl)-amino propane and p-methylbenzoyl chloride.

25. 1-(m-trifluoromethylphenyl)-2-[β-(α'-phenylbutyryloxy-ethyl]-amino propane hydrochloride, M.P. 109°–110° C. (ethyl/acetate), starting from 1-(m-trifluoromethylphenyl)-2-(β-hydroxy-ethyl)-amino propane and α-phenylbutyric acid chloride.

26. 1-(m-trifluoromethylphenyl)-2-[β-(3',4'-methylenedioxy benzoyloxy)-ethyl]-amino propane hydrochloride, M.P. 150°–151° C. (ethyl acetate), starting from 1-(m-trifluoromethylphenyl)-2-(β-hydroxy-ethyl)-amino propane and 3,4-methylenedioxybenzoyl chloride.

27. 1-(m-trifluoromethylphenyl)-2-[β-(3',4'-dimethylbenzoyloxy)-ethyl]-amino propane hydrochloride, M.P. 172° C. (ethanol), starting from 1-(m-trifluoromethylphenyl)-2-(β-hydroxy-ethyl)-amino propane and 3,4-dimethylbenzoyl chloride.

28. 1-(m-trifluoromethylphenyl)-2-[β-(p-isobutylphenylacetyloxy)-ethyl]-amino propane hydrochloride, M.P. 123° C. (ethyl acetate), starting from 1-(m-trifluoromethylphenyl)-2-(β-hydroxy-ethyl)-amino propane and p-isobutylphenylacetic acid chloride.

29. 1-(m-trifluoromethylphenyl)-2-[β-(p-chlorophenylacetyloxy)-ethyl]p-amino propane hydrochloride, M.P. 115° C.(ethyl acetate), starting from 1-(m-trifluoromethylphenyl-2-(β-hydroxy-ethyl)-amino propane and p-chlorophenylacetic acid chloride.

30. 1-(m-trifluoromethylphenyl)-2-[β-(α'-naphthoyloxy)-ethyl]-amino propane hydrochloride, M.P. 171° C. (isopropanol), starting from 1-(m-trifluoromethylphenyl)-2-(β-hydroxy-ethyl)-amino propane and α-naphthoyl chloride.

31. 1-(m-trifluoromethylphenyl)-2-[β-(β'-naphthoyloxy)-ethyl]-amino propane hydrochloride, M.P. 205°–206° C. (ethanol), starting from 1-(m-trifluoromethylphenyl)-2-(β-hydroxy-ethyl)-amino propane and β-naphthoyl chloride.

32. 1-(m-trifluoromethylphenyl)-2-[β-(p-nitrobenzoyloxy)-ethyl]-amino propane hydrochloride, M.P. 180°–182° C. (ethanol), starting from 1-(m-trifluoromethylphenyl)-2-(β-hydroxy-ethyl)-amino propane and p-nitrobenzoyl chloride.

33. 1-(m-trifluoromethylphenyl)-2-[β-(p-aminobenzoyloxy-ethyl]-amino propane hydrochloride, M.P. 166°–168° C. (isopropanol), by hydrogenation, under a pressure of 6 kg./cm.$^2$ in presence of platinum as catalyst, of 1-(m-trifluoromethylphenyl)-2-[β-(p-nitrobenzoyloxy)-ethyl]-amino propane hydrochloride in suspension in absolute ethanol.

34. 1-(m-trifluoromethylphenyl)-2-[β-(o-aminobenzoyloxy)-ethyl]-amino propane dihydrochloride, M.P. 160°–165° C. (ethanol/isopropanol) by hydrogenation of 1-(m-trifluoromethylphenyl)-2-[β-(o-nitrobenxoyloxy)-ethyl]-acid amino propane hydrochloride.

35. 1-(o-trifluoromethylphenyl)-2-(β-benzoyloxy-ethyl)-amino propane hydrochloride, starting from 1-(o-trifluoromethylphenyl)-2-(β-hydroxy-ethyl)-amino propane and benzoyl chloride.

Various modifications and equivalents will be apparent to one skilled in the art and may be made in the compounds, compositions, and methods of the present invention without departing from the spirit or scope thereof.

1. A compound selected from the group consisting of (A.) trifluoromethylphenyl aminopropane compounds of the formula

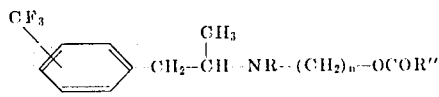

wherein
R represents a substituent selected from the group consisting of hydrogen and lower-alkyl of up to 5 carbon atoms, inclusive,
n represents 2 or 3,
R'' is selected from the group consisting of phenyl, phenyl-lower alkyl, halophenyl, hydroxyphenyl, trifluoromethylphenyl, aminophenyl, nitrophenyl, and methylenedioxyphenyl, racemic mixtures of such compounds, optical isomers thereof, and (B.) physiologically acceptable acid addition salts thereof.

2. A compound of claim 1 which is 1-(m-trifluoromethylphenyl)-2-(β-benzoyloxyethyl)-amino propane.

3. A compound of claim 1 which is 1-(m-trifluoromethylphenyl)-2-(β-phenylpropionyloxy-ethyl)-amino propane.

4. A compound of claim 1 which is 1-(m-trifluoromethylphenyl)-2-[β-(o-chlorobenzoloxy)-ethyl]-amino propane.

5. A compound of claim 1 which is 1-(m-trifluoromethylphenyl)-2-[β-(m-trifluoromethylbenzoyloxy)-ethyl]-amino propane.

6. A compound of claim 1 which is 1-(m-trifluoromethylphenyl)-2-[β-(m-trifluoromethylbenzoyloxy)-ehtyl]-amino propane.